M. LUDLUM,
Improvement in Flower-Pots.
No. 129,972. Patented July 30, 1872.
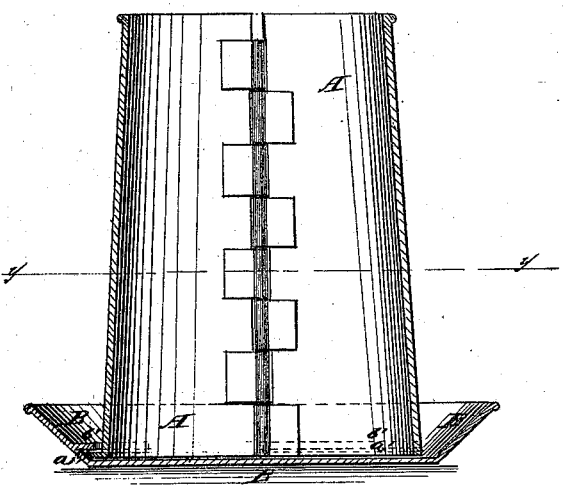
Fig. 1.
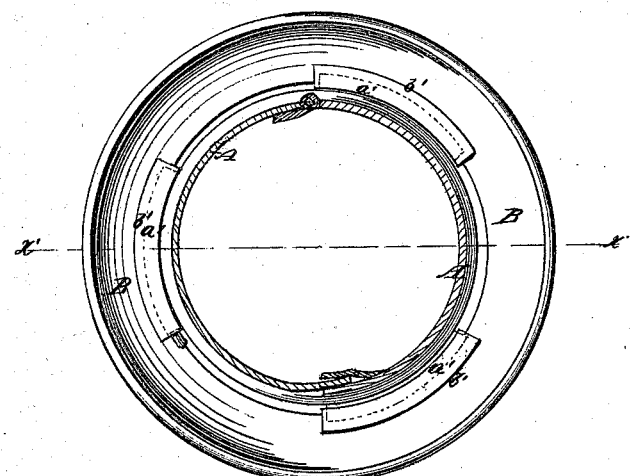
Fig. 2.
Fig. 3.
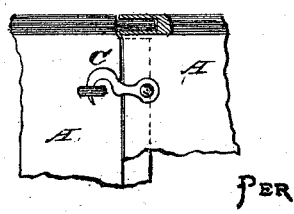
Witnesses:
P. C. Dieterich
W. A. Graham
Inventor:
Matthias Ludlum
per ⎯⎯⎯ Attorneys.

UNITED STATES PATENT OFFICE.

MATTHIAS LUDLUM, OF MIDDLEBURY, VERMONT.

IMPROVEMENT IN FLOWER-POTS.

Specification forming part of Letters Patent No. 129,972, dated July 30, 1872.

Specification describing a new and useful Improvement in Flower-Pots, invented by MATTHIAS LUDLUM, of Middlebury, in the county of Addison and State of Vermont.

In the accompanying drawing, Figure 1 is a detail vertical section of my improved flower-pot taken through the line $xx$, Fig. 2. Fig. 2 is a detail horizontal section of the same taken through the line $yy$, Fig. 1. Fig. 3 is a detail view of a part of the body of the same, showing the manner in which the sections are connected.

Similar letters of reference indicate corresponding parts.

My invention has for its object to improve the construction of my improved flower-pot patented March 1, 1870, and numbered 100,300, so as to make it more convenient and satisfactory in use, and so as to adapt it to be removed from plants too bushy or brittle or twining to pass through it; and it consists in the combination of a saucer with the bottomless body, and in the bottomless body made in sections, as hereinafter more fully described.

A is the body of the flower-pot, which increases in size toward its lower edge to give more space for the roots of the plants. To the lower edge of the body A are secured, or upon it are formed, three or more outwardly-projecting flanges, $a'$, which enter corresponding grooves, or interlock with corresponding flanges $b'$ formed upon or attached to the inner surface of the saucer B, so that the said saucer B may be conveniently attached to and detached from the body A, when desired. This construction allows the air to pass in freely around the lower edge of the body A to the roots of the plants. The body A is made in two or more sections, hinged to each other, as shown in Figs. 1 and 2. One of the seams is left open, one of the edges that form said seam having a groove formed in it to receive the other edge, as shown in Figs. 2 and 3. The edges of the sections that form the open seam are secured to each other by a hook, C, pivoted to one section, and hooking into an eye attached to the other section. This construction allows the body of the flower-pot to be opened up and removed from the soil and roots of the plants when said plants are too large, bushy, or tender to pass through the pot, or when they are long or twining vines, so that they may be repotted or set in the ground without injuring them or even checking their growth.

The flower-pots may be made of pottery, metal, or wood, as may be desired or convenient.

Having thus described my invention, I claim as new and desire to secure by Letters Patent—

As an article of manufacture, the bottomless pot A, whose side sections are hinged to one another and secured detachably to a saucer, B, as described.

MATTHIAS LUDLUM.

Witnesses:
WILLARD R. CRAY,
HENRY VILLROY LUDLUM.